GEORGE R. HARDING.
Improvement in Animal Traps.
No. 120,063. Patented Oct. 17, 1871.
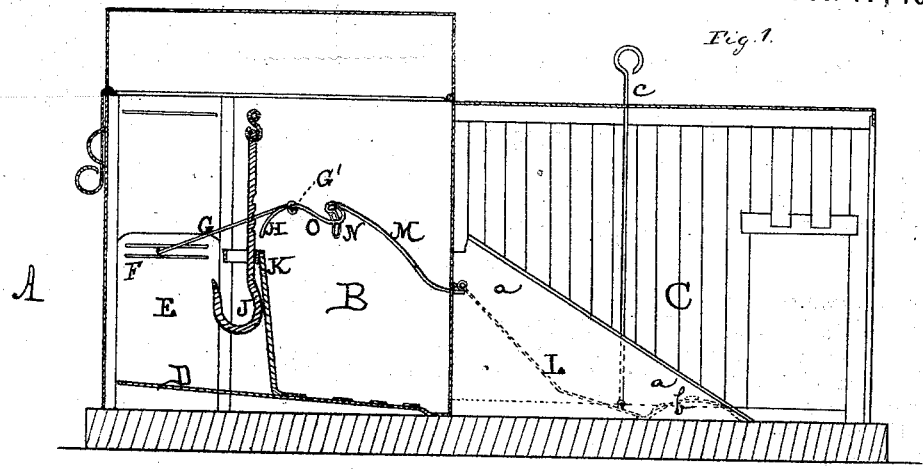
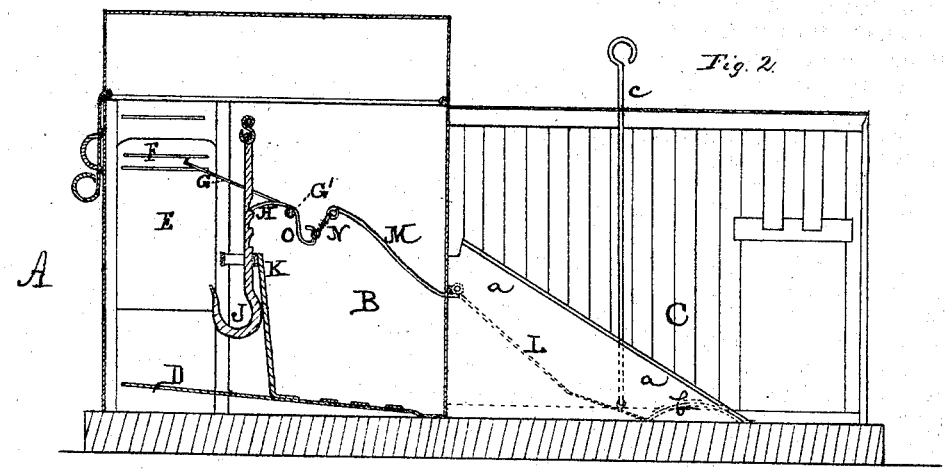
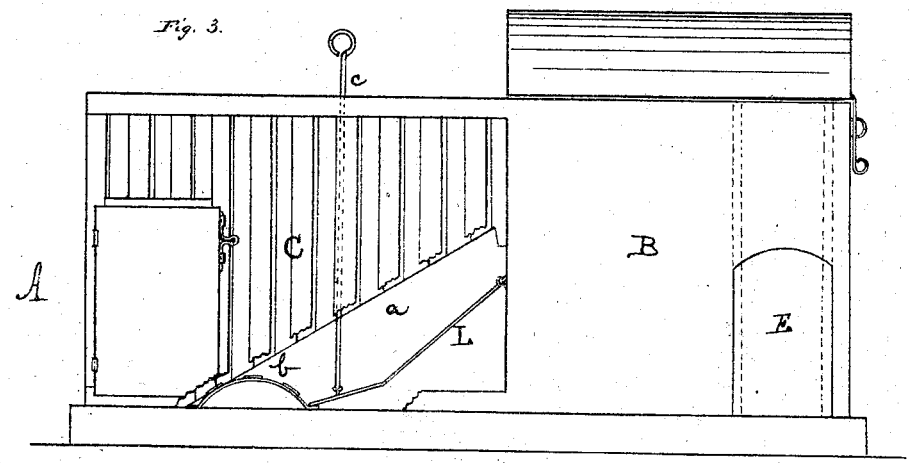

// 120,063

UNITED STATES PATENT OFFICE.

GEORGE R. HARDING, OF MANCHESTER, VIRGINIA.

IMPROVEMENT IN ANIMAL-TRAPS.

Specification forming part of Letters Patent No. 120,063, dated October 17, 1871.

*To all whom it may concern:*

Be it known that I, GEORGE R. HARDING, of Manchester, in the the county of Chesterfield and State of Virginia, have invented new and useful Improvements in Traps; and I do hereby declare the following to be a clear and exact description of the nature thereof sufficient to enable others skilled in the art to which my invention appertains to fully understand and use the same, reference being had to the accompanying drawing making part of this specification, in which—

Figure 1 is a side view, partly in section, showing the parts in a closed state. Fig. 2 is a similar view, showing the parts open or set. Fig. 3 is a view opposite to the side shown in Figs. 1 and 2.

Similar letters of reference indicate corresponding parts in the several figures.

This invention relates to a self-adjusting trap; and consists in the combination of various parts operating together, as will be set forth.

Referring to the drawing, A represents a box consisting of two divisions, B C, of which the division B may be termed the bait and trapping-chamber, and the division C the confining-chamber. At or near the bottom of the chamber C there is arranged a platform, D, which is hinged or made to swing or tilt in any well-known manner. E represents doors, which occupy positions at the sides of the chamber C, and adapted in the present case to slide vertically in suitable guides on the sides of the chamber. On the inner faces of the doors there are secured horizontal straps or ways F, in which play one end of rods or levers G, which are denominated the lifting-levers. Their other ends are connected to a rock-shaft, G', whose bearings are in the sides of the chamber. To this rock-shaft is attached a dog, H, which is adapted to engage with notches on the bait-hook J, which is properly suspended within the chamber and within convenient reach of the animals when within the chamber. K represents a tripper, which is secured to a rod or arm rising from the platform, arranged to press the bait-hook and thus release the dog H in order to cause the doors E to drop and thereby inclose the animal B. L is the trap-door, arranged within the chamber C, and to it is secured an arm, M, which extends into the chamber B, and by a chain, link, or similar connection, N, is attached to the rock-shaft G' through the medium of an arm, O. On the side of the trap-door L is arranged a guard, *a*, and at the free end of said door on the floor of the chamber C I place a sill, *b*, whereby, when the animal is within the chamber C, the trap-door cannot be raised and the animal return to chamber D. A rod, *c*, is secured to the trap-door and extends outside of the box A for purposes to be explained.

The operation is as follows: The trap may be set by lifting the doors from without. This, by means of the levers G, causes the rock-shaft to turn and draws up the dog H, which catches on one of the notches of the bait-hook, whereby the trap is set and the doors held open, or, by lifting the rod *c* the trap-door L is raised, and by means of the arms M O the rock-shaft is turned, the operation of setting being then as previously described. The trap-door L then returns to its first position, and by either of the operations stated the trap is set and ready for use. When the animal enters the chamber B and seizes the bait on the hook J he draws the latter away from the dog H, whereby the rock-shaft is disengaged and the doors E are caused to fall. The same result is produced if the animal steps on the platform D, in which case the depression of the platform operates the tripper K, which presses against the bait-hook and forces it from the dog. The animal is now caught within the chamber B, but, seeing the light in chamber C, he passes thereinto, and in this movement raises the trap-door. This resets the trap in a manner similar to that produced by the rod *c*, as has been described, the operation, however, being automatic. The trap-door also assumes its normal position, and the animal is now securely confined within the chamber C, where he may be disposed of or removed therefrom through the exit-doors, as usual in such cases.

Having thus described my invention, what I claim as new, and desire to secure by Letters Patent, is—

1. The notched bait-hook J, [in combination with the dog H, rock-shaft G', arms G, ways F, and doors E, operating together, substantially as described.

2. The tripper K rising from the platform D, operating in combination with said platform and with the notched hook J, dog H, and doors E, substantially as described.

3. The trap-door L with arm M and the connection N, in combination with the rock-shaft G', dog H, hook J, arms G, and doors E, substantially as and for the purpose described.

The above this day signed by me, August 15, 1871.

G. R. HARDING.

Witnesses:
 C. C. CLARKE,
 PERCY V. KNEASS.    (143)